Figure 1:
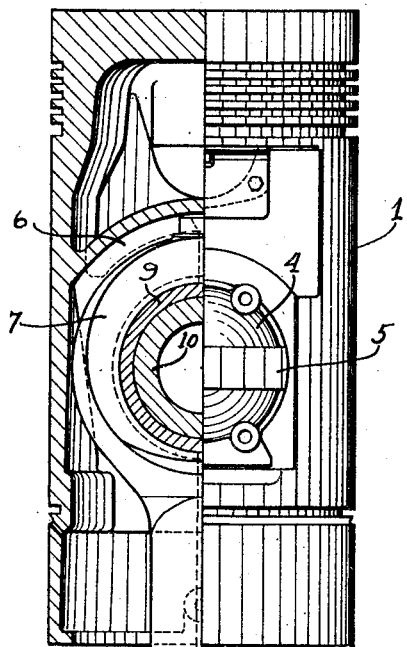

Jan. 20, 1931.        G. J. RATHBUN         1,789,840
PISTON AND ROD CONNECTION
Filed June 30, 1930

Inventor
George J. Rathbun,
By Owen F. Owen,
Attorneys

Patented Jan. 20, 1931

1,789,840

UNITED STATES PATENT OFFICE

GEORGE J. RATHBUN, OF TOLEDO, OHIO, ASSIGNOR TO THE RATHBUN-JONES ENGINEERING COMPANY, OF TOLEDO, OHIO, A CORPORATION OF OHIO

PISTON AND ROD CONNECTION

Application filed June 30, 1930. Serial No. 464,815.

This invention relates to means for connecting pistons and their piston rods and has particular reference to such means used in connection with large engines of the internal combustion type in which both the gas pressure and inertia loads are very heavy, but widely different, and wherein it is desirable to so distribute the metal in the piston, the piston pin, and the connecting rod, and to so relatively arrange the bearing surfaces of such parts as to obtain maximum efficiency and strength with minimum weight and maximum bearing contact of the parts.

There are three types of engine cross-head journals:—(1) Where the pin is fixedly held in the piston and journaled in the rod end; (2) Where the pin is fixedly held in the rod end and journaled in the piston; and (3) Where the pin is of the floating type and journaled in both the piston and the rod end. While the present invention is intended more particularly for use in connection with the third mentioned or floating type of cross-head journals, it is not restricted to such use, but may be used to advantage in connection with either of the others.

It is obvious that if said third mentioned type is to be used, particularly on a large engine, the surface exposed to wear should be the maximum for the reason that no adjustment can be made for wear, thus necessitating replacement of the worn parts, which are necessarily quite expensive, when the wear reaches a certain amount. In gas engine operation, it is apparent that the loading on the piston pin journals is very much greater due to the gas pressure thrust of the piston than is due to the inertia of the piston, which latter, however, may be of considerable magnitude with relatively high speed engines. In view of this difference in pressure, it is desirable that the pin bearings be larger on one side than on the other, and this has heretofore been accomplished by providing what is termed "stepped" bearings which are obtained by notching the coacting bearing parts so that the end portion of the rod bearing toward the explosion end of the piston is of narrow form, while the opposed portion of the rod bearing is abruptly broadened by the notched form thereof so as to produce a broad bearing surface at such side. This stepped form of bearing for the piston rod is found in practice to be objectionable for the reason that the bushings which are customarily pressed or shrunk into the rod and piston, do not have their compressive stresses uniformly distributed, and also for the reason that it provides weakened portions in the connection between the piston rod and piston due to the improper distribution of metal and does not efficiently accomplish the purpose intended.

The object of the present invention is to so fashion the bearing parts of a connection of this character that not only a larger pin may be utilized, but also that material may be so distributed as to withstand the stresses applied without increasing the weight. Further objects and advantages will be apparent from the following detailed description.

While the invention in its broader aspect is capable of embodiment in numerous forms, a preferred embodiment thereof is illustrated in the accompanying drawings, in which—

Figure 2:
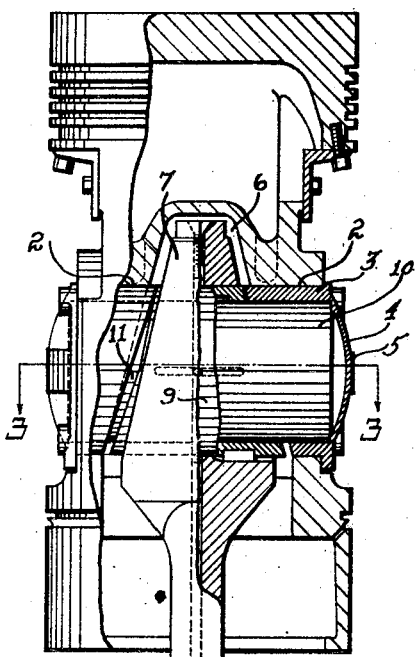
Figure 3:
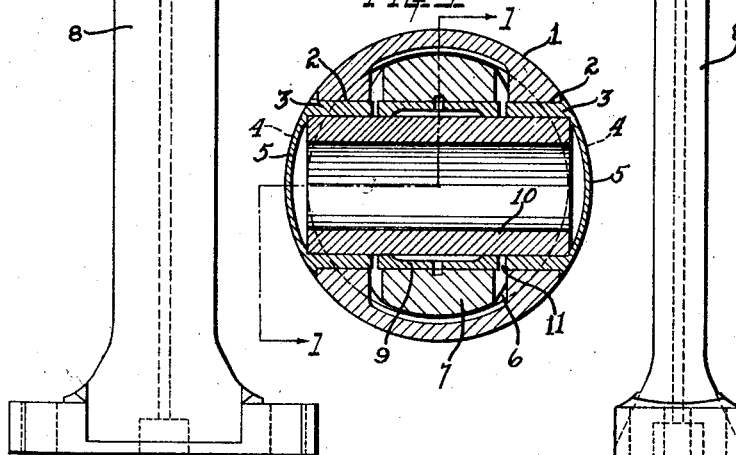
Figure 4:
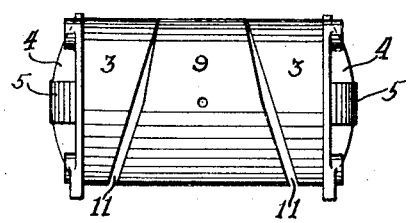

Figure 1 is a side elevation of a piston and piston rod connection therewith embodying the invention, with parts in central vertical section; Fig. 2 is a similar view taken at a different angle and with parts broken away and in section; Fig. 3 is a cross-section on the line 3—3 in Fig. 2; and Fig. 4 is an elevation of the bushing members which are shrunk into the rod and piston and which embody features of the invention.

Referring to the drawings, 1 designates a piston of any suitable construction having a transverse opening therethrough forming cylindrical bearings 2 at its ends, in each of which a bearing bushing 3 is mounted. These bushings are pressed or shrunk into the piston bearings so that they are fixedly secured thereto. The outer end of each bushing 3 is closed by a cap portion 4, which has a cylindrical cross portion 5 conforming to the cross-sectional shape of the cylinder in which the piston is to be mounted for engagement with its wall to prevent outward movement of the bushings during use should they happen to become loosened in the piston bearings.

The piston pin receiving opening of the piston is provided with a radial enlargement 6 to receive the adjacent pin embracing end portion 7 of a piston rod 8 and such enlargement is open at the bottom or outer end of the piston to permit the projection of the rod therethrough. The pin receiving or strap end of the piston rod has a bearing bushing 9 shrunk therein so as to be fixedly attached thereto and this bushing is disposed between the end bushings 3, 3. The piston pin 10 is of the floating type, being mounted loosely in the bushings 3 and 9. It is, however, prevented from any considerable endwise movement in the bushings by coaction at its ends with the cap portions 4 of the end bushings.

In carrying out the feature of my invention, the strap portion 7 of the piston rod is made of wedge shape being provided with oppositely tapered sides with the small end of the wedge disposed toward the inner or working end of the piston and opposed to the direction of projection of the piston rod therefrom. This provides the piston rod with a broad bearing surface opposed to the working or gas pressure receiving end of the piston, and such bearing surface gradually reduces in width from the outer end of the piston to the inner end thereof so that no notching of the pin embracing end of the piston rod and consequent abrupt angles are present. The opening enlargement 6 in the piston is of corresponding tapered shape to the strap end of the piston rod, thus rendering the bearings 2 broad at their upper or inner sides and narrow at their lower or outer sides with the metal between such surfaces gradually narrowing in tapered form from the greater to the narrower width.

The end bushings 3 have their inner ends cut off on a taper corresponding to that of the bearings 2, and the bushing 9, which is engaged in the piston rod opening, is tapered to correspond to the taper of the strap end of the piston rod, as clearly shown in Figs. 2 and 4. A clearance 11 is provided between the adjacent ends of the bushings 3 and 9 to permit a rocking of the latter relative to the former.

It will be noted that by providing the bearing surfaces between the piston and pin and between the pin and piston rod in tapered form as shown, the piston bearings 2 are broad at points subjected to the greatest stresses resulting from the transmission of gas pressure loads to the piston pin, and that likewise the portion of the bearing surface of the piston rod which receives the greatest load during a running of the engine is the broadest, and that these broad bearing surfaces respectively gradually narrow to a width commensurate in area with the inertia loads which they are to bear.

By gradually tapering the respective bearing surfaces, it is possible to so efficiently distribute the metal around such surfaces that a larger pin can be used than has otherwise been found practical, which is a feature of value in engines of this character.

I wish it understood that my invention is not limited to any specific construction, arrangement or form of the parts, as it is capable of various modifications without departing from the spirit of the claims.

Having thus described my invention, what I claim as new and desire to secure by United States Letters Patent is:

1. In combination, a piston, a piston rod, and a pin connecting the two, the bearings in the piston for the pin being tapered to present the broadest bearing surface to the pin at the side thereof adjacent to the force receiving end of the piston.

2. In combination, a piston, a piston rod, and a pin connecting the two, the bearing between the piston rod and pin being tapered to present the broadest bearing surface of the rod to the pin at the side thereof opposed to the force receiving end of the piston.

3. In combination, a piston, a piston rod, and a pin connecting the two, the bearings in the piston for the pin being tapered to present the broadest bearing surface to the pin at the side thereof adjacent to the force receiving end of the piston and the bearing between the piston rod and the pin being tapered to present the broadest bearing surface of the rod to the pin at the side thereof opposed to the force receiving end of the piston.

4. A piston rod having its piston pin receiving end of wedge form to present a broad bearing surface to the pin at the gas pressure thrust receiving side and to present a gradually narrowed surface to the inertia thrust receiving side of the pin.

5. A piston having an opening therein for a piston rod connecting pin, said opening forming bearings at opposite sides of its axial center, which bearings have their inner ends tapered so that the broadest portions of their bearing surfaces are disposed adjacent to the force receiving end of the piston.

6. In a piston, a piston pin receiving opening forming end bearings, bushings secured in said end bearings and a piston pin journaled in said bushings, said bearings and bushings each being tapered at their inner ends so that the bearing surfaces thereof are broadest at points adjacent to the force receiving end of the piston.

7. In a piston, a piston pin receiving opening forming end bearings, bushings secured in said end bearings and a piston pin journaled in said bushings said bearings and bushings each being tapered at their inner ends so that the bearing surfaces thereof are broadest at points adjacent to the force receiving end of the piston, a piston rod having a pin embracing end with a bearing opening therein, a bushing secured in said opening and journaled on said pin intermediate said end bushings, said rod bushing and the embracing portion of the rod being tapered so as to present the broadest bearing surface to the pin at the side thereof opposed to the force receiving end of the piston.

In testimony whereof I have hereunto signed my name to this specification.

GEORGE J. RATHBUN.